United States Patent
Ording (10) Patent No.: US 8,181,119 B1
(45) Date of Patent: May 15, 2012

(54) USER INTERFACE WITH INLINE CUSTOMIZATION

(75) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 669 days.

(21) Appl. No.: 10/859,823

(22) Filed: Jun. 2, 2004

(51) Int. Cl.
*G06F 3/048* (2006.01)

(52) U.S. Cl. ........................................ 715/810; 715/845

(58) Field of Classification Search .................. 715/843, 715/815, 845, 826
See application file for complete search history.

(56) References Cited

U.S. PATENT DOCUMENTS

| | | | | |
|---|---|---|---|---|
| 5,644,737 | A * | 7/1997 | Tuniman et al. | 715/810 |
| 5,657,049 | A * | 8/1997 | Ludolph et al. | 715/856 |
| 5,828,376 | A * | 10/1998 | Solimene et al. | 715/821 |
| 6,133,915 | A * | 10/2000 | Arcuri et al. | 715/779 |
| 6,201,539 | B1 * | 3/2001 | Miller et al. | 715/866 |
| 6,278,450 | B1 * | 8/2001 | Arcuri et al. | 715/763 |
| 6,924,827 | B1 * | 8/2005 | Gulati et al. | 715/763 |
| 7,360,167 | B2 * | 4/2008 | Hennum et al. | 715/772 |
| 7,620,911 | B2 * | 11/2009 | Webb | 715/809 |
| 7,624,356 | B1 * | 11/2009 | Rockey et al. | 715/811 |
| 8,069,419 | B2 * | 11/2011 | Sanders et al. | 715/828 |
| 2002/0091741 | A1 * | 7/2002 | Ferreira et al. | 707/530 |
| 2002/0154166 | A1 * | 10/2002 | Sanders et al. | 345/764 |
| 2003/0188260 | A1 * | 10/2003 | Jensen et al. | 715/505 |
| 2004/0001109 | A1 * | 1/2004 | Blancett et al. | 345/843 |
| 2005/0198582 | A1 * | 9/2005 | Hennum et al. | 715/772 |

OTHER PUBLICATIONS

Cline, et al, "Window Closing Animations", IBM Technical Disclosure Bulletin, vol. 38, No. 11, p. 13, Nov. 1995.*
Davis, Jeff, "Using wildcards when you find and replace in Word," TechRepublic, Real World, Real Time, Real IT, http://techrepublic.com.com/5102-6270-1043736.html, 4 pp., Jan. 4, 2000.
Author Unknown, "Finding files and folders on Mac OS X 10.2, 10.3," http://doc.info.apple.com/article.html?artnum=107005, 3 pp. Aug. 22, 2002.

\* cited by examiner

*Primary Examiner* — William Bashore
*Assistant Examiner* — Henry Orr
(74) *Attorney, Agent, or Firm* — Jones Day (57) ABSTRACT

A graphical user interface (GUI) having functionality for inline customization is disclosed. A first set of user manipulable elements are displayed within a GUI object. Each of the user manipulable elements of the first set is selectable for display within the GUI object. A selection of a second set of user manipulable elements from among the first set of elements is received. Unselected elements of the first set of elements are removed from the GUI object. The second set of user manipulable elements are displayed within the GUI object. In one aspect, a first user input renders the first set of user manipulable elements selectable for display within the GUI object, while a second user input renders the second set of user manipulable elements unselectable. In various aspects, the GUI object may be a window, a menu bar, or an object that describes properties of a file.

39 Claims, 10 Drawing Sheets

USER INTERFACE WITH INLINE CUSTOMIZATION

TECHNICAL FIELD

This disclosure relates generally to user interfaces for digital processing systems, and in particular, relates to a graphical user interface which may be customized inline.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2004, Apple Computer, Inc., All Rights Reserved.

BACKGROUND OF THE INVENTION

Graphical User Interfaces (GUIs) provide computer system users a visual and intuitive means for interacting with the computer system. Many operating systems and applications have GUIs which may be customized by users to meet their own needs and preferences. However, such customization often requires foreknowledge of the features available for inclusion in the GUI, in addition to knowledge of how to effect the desired alteration. For example, to customize a GUI of a particular application program, a user is often required to navigate through various hierarchical menus or toolbars, after which they are confronted with a variety of control panels and/or dialog boxes which must be properly configured in order to enable a variety of GUI features. As such, the process of installing various optional functions and/or features to customize different GUI objects may be unnecessarily complicated.

SUMMARY OF THE DESCRIPTION

The present invention relates to a graphical user interface (GUI) having functionality for inline customization. In one exemplary aspect, a GUI object is displayed. A first set of user manipulable elements are displayed within the GUI object. Each of the user manipulable elements of the first set is selectable for display within the GUI object. A selection of a second set of user manipulable elements from among the first set of elements is received. Any unselected elements of the first set of elements are removed from the GUI object. The second set of user manipulable elements are then displayed within the GUI object. In one aspect, a first user input renders the first set of user manipulable elements selectable for display within the GUI object, while a second user input renders the second set of user manipulable elements unselectable for display within the GUI object. In one aspect, the GUI object is a window. In another aspect, the GUI object is a menu bar.

In another aspect, a GUI object that describes properties of a file is displayed. A first set of elements are displayed within the GUI object. Each element of the first set is selectable for display within the GUI object. A selection of a second set of elements is received from among the first set of elements. Unselected elements of the first set of elements are removed from the GUI object. The second set of elements are then displayed within the GUI object. In one aspect, the GUI object is a save dialog object to save the file.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
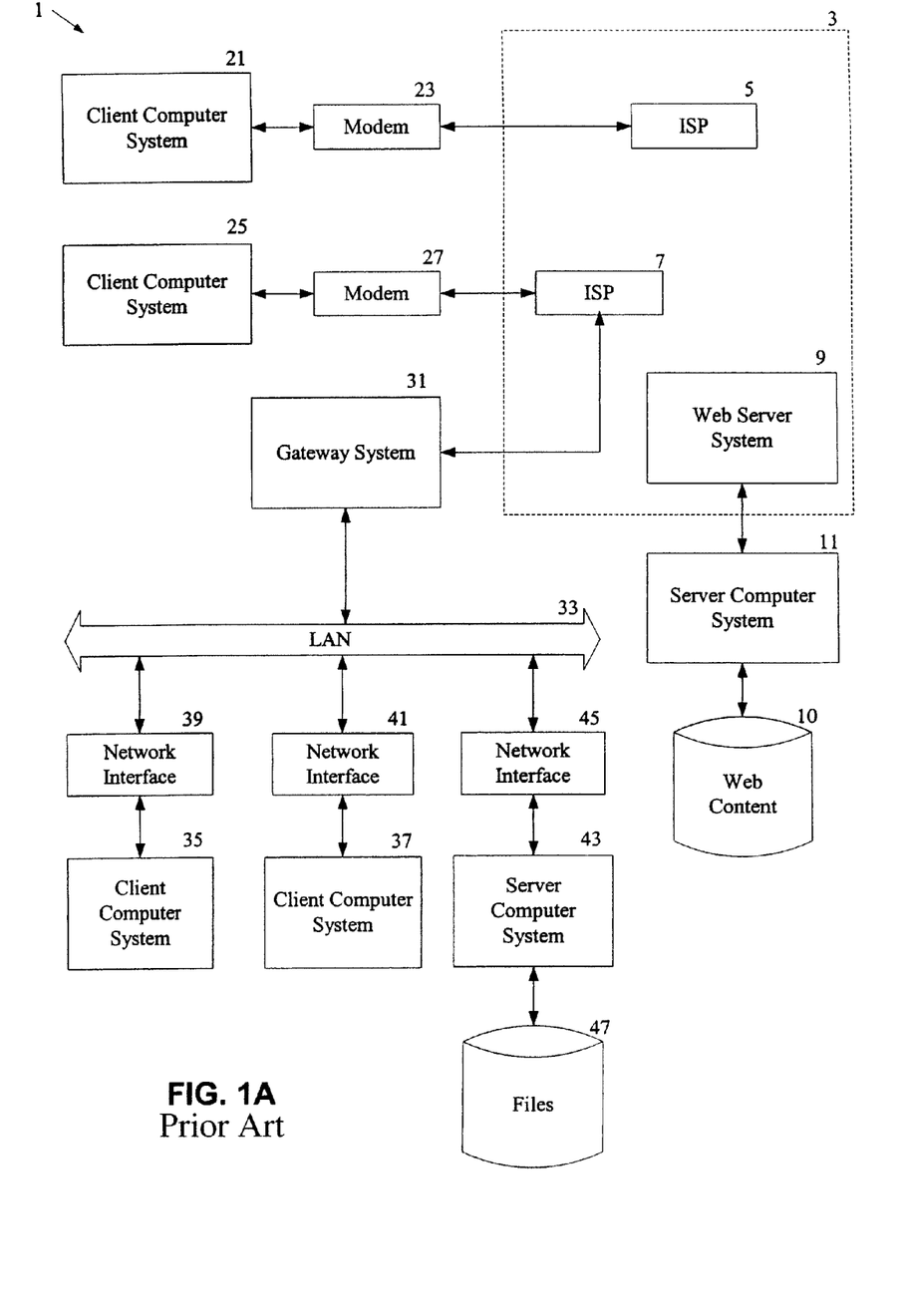
FIG. 1A illustrates an embodiment of an operating environment suitable for practicing the present invention.
Figure 1B:
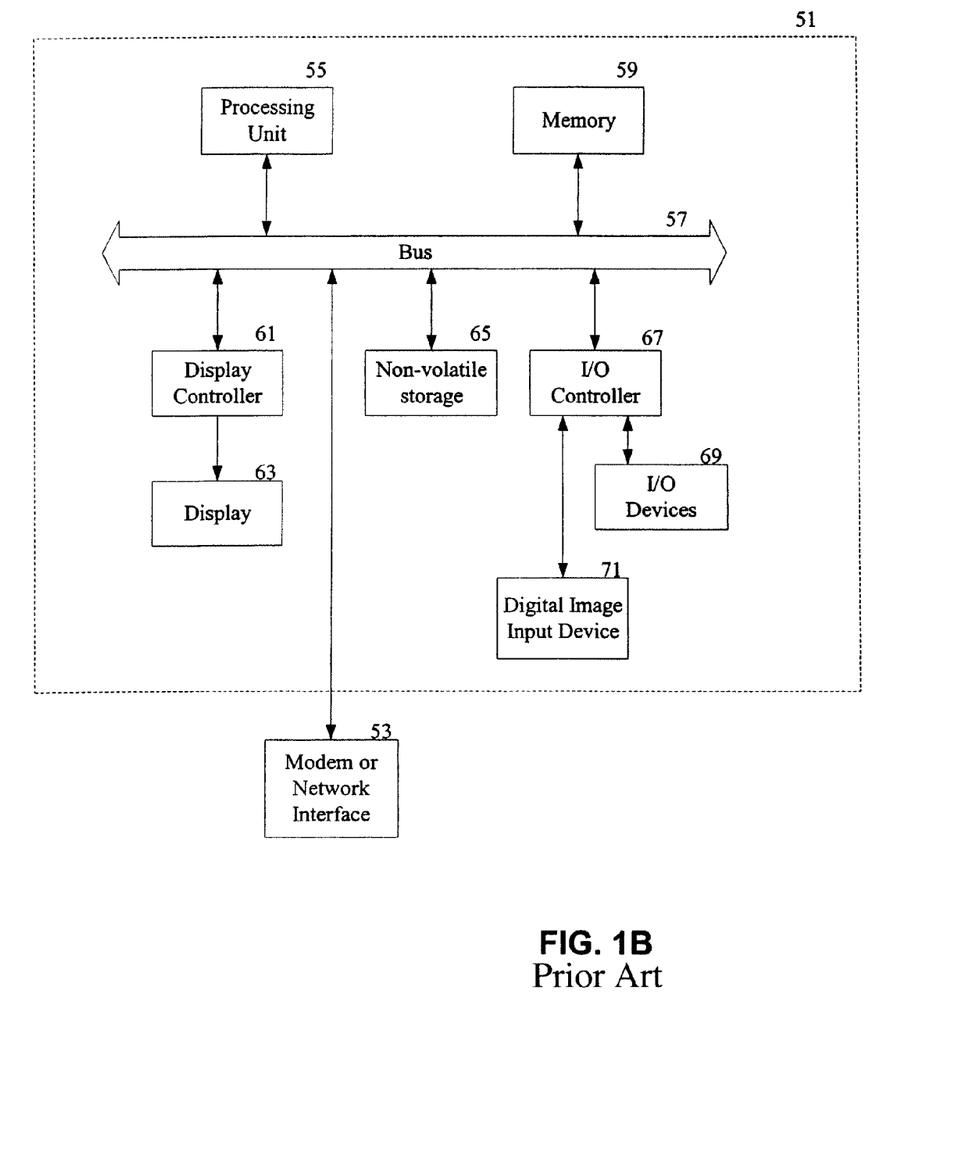
FIG. 1B illustrates an embodiment of a computer system suitable for use in the operating environment of FIG. 1A.

The following description of FIGS. 1A and 1B is intended to provide an overview of computer hardware and other operating components suitable for implementing embodiments of the invention described below, but is not intended to limit the applicable environments. One of skill in the art will immediately appreciate that the invention can be practiced with other computer system configurations, including hand-held devices, cellular telephones, multiprocessor systems, microprocessor-based or programmable consumer electronics/appliances, network PCs, minicomputers, mainframe computers, and the like. Embodiments of the invention can also be practiced in distributed computing environments where tasks are performed by remote processing devices that are linked through a communications network.

FIG. 1A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7. Access to the Internet allows users of the client computer systems to exchange information, receive and send emails and instant messages, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 1A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, consumer electronics/appliance, a network computer, a Web TV system, a handheld device, or other such computer system. Similarly, the ISP 7 provides Internet connectivity for client systems 25, 35, and 37, although as shown in FIG. 1A, the connections are not the same for these three computer systems. Client computer system 25 is coupled through a modem interface 27 while client computer systems 35 and 37 are part of a LAN. While FIG. 1A shows the interfaces 23 and 27 as generically as a "modem," it will be appreciated that each of these interfaces can be an analog modem, ISDN modem, DSL modem, cable modem, satellite transmission interface, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 1B shows one example of a conventional computer system that can be used as a client computer system or a server computer system or as a web server system. The computer system of FIG. 1B may, for example, be an Apple Macintosh computer. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, DSL modem, cable modem, token ring interface, satellite transmission interface, or other interfaces for coupling a computer system to other computer systems. The computer system 51 includes a processing unit 55, which can be a conventional microprocessor such as a G3, G4, or G5 microprocessor from Motorola, Inc. or IBM, a Motorola Power PC microprocessor, or an Intel Pentium microprocessor. Memory 59 is coupled to the processor 55 by a bus 57. Memory 59 can be dynamic random access memory (DRAM) and can also include static RAM (SRAM), among other types of well-known memory devices. The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display (LCD). The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompass a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 1B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Mac® OS operating system from Apple Computer, Inc. of Cupertino, Calif., and their associated file management systems. The file management system is typically stored in the non-volatile storage 65 and causes the processor 55 to execute the various acts required by the operating system to input and output data and to store data in memory, including storing files on the non-volatile storage 65.

Figure 2A:
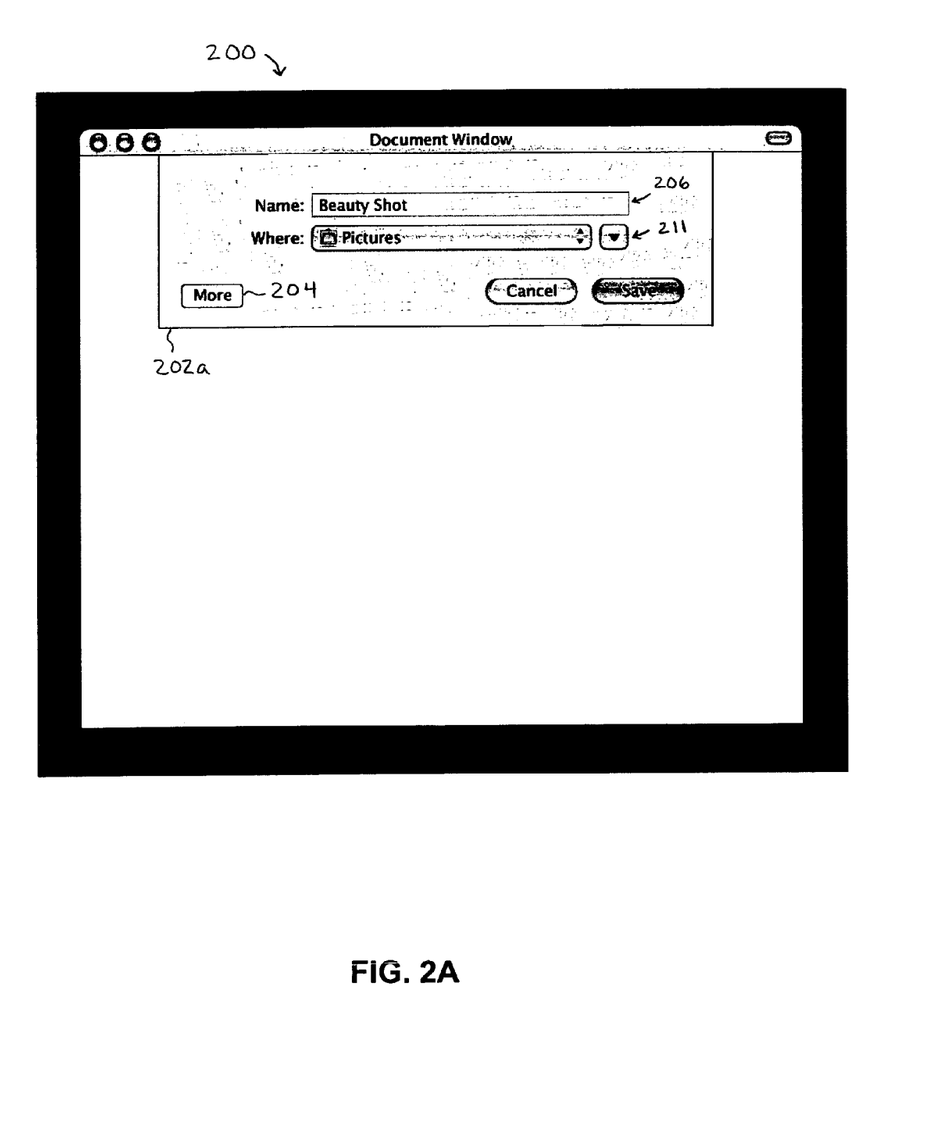
FIGS. 2A-2F illustrate embodiments of a graphical user interface window having an inline customization functionality.

FIG. 2A illustrates an embodiment of a graphical user interface (GUI) object having an inline customization functionality. In one embodiment, a GUI object is an element of a user interface upon which user manipulable GUI elements are presented. Examples of GUI objects include windows (e.g. document, application, utility, dialog and alert windows), sheets, lists, menus (e.g. popup menus, pull-down menus), title bars, menu bars, toolbars, taskbars, palettes, clipboards, docks, and drawers (a child window that slides out from a parent window), among others. In one embodiment, a user manipulable GUI element is an element within the GUI object which is capable of being directly manipulated by a user through an input device. In one embodiment, user manipulable GUI elements include graphic objects that cause actions or visible results when the user manipulates them with an input device. In one embodiment, a user may manipulate such an element through an input device, such as a mouse, a pointing device, or a keyboard, among other devices. Examples of user manipulable GUI elements are varied, and include such elements as buttons, selection controls, radio buttons, checkboxes, menus, pop-up menus, pull-down menus, fields, text input fields, selection fields or other input fields, among others.

In the embodiment illustrated in FIG. 2A, dialog window 202a is a GUI object which may be customized inline. By inline customization, it is meant that the inclusion of GUI elements within a GUI object (e.g. window 202a) may be controlled through functionality provided within the GUI object itself. In other words, the controls for customizing the GUI object are presented to a user within the GUI object itself. This stands in contrast to conventional GUI customization techniques which require a user to navigate through various menus or to manipulate controls which are remote from or otherwise visually unconnected to the GUI object being customized. The inline customization feature of embodiments of the present invention provide a user the ability to customize a GUI object through an intuitive interface which promptly and efficiently presents a user with available options and the means to include them in the GUI object.

A dialog window 202a is displayed within window 200. In the embodiment illustrated in FIG. 2A, dialog window 202a is a Save dialog window, which presents a user with options for saving changes to a file or document, such as a document presented in document window 200. In one embodiment, the Save dialog is a properties sheet that describes the characteristics of files or documents to be saved, and allows a user to designate characteristics of the saved file or document. For example, a user may name or rename a document, and choose a location to store it, among other options. The dialog window 202a is a GUI object. Dialog window 202a includes two user manipulable GUI elements 206 and 211. GUI element 206 is a text input field which allows a user to input a name for the document or file to be saved. GUI element 206 is capable of receiving alphanumeric (e.g. text) input from a user. For example, a user may use a keyboard to enter the name of a document to be saved, such as "Beauty Shot," as illustrated in FIG. 2A. GUI element 211 is a pop-down menu which is used to present a list of mutually exclusive choices. For example, a user may activate the GUI element 211 through a mouse click, which causes a menu of choices to appear, allowing the user to specify a location to save the document. Dialog window 202a includes a button 204. In one embodiment, the button 204 may be labeled "More," to indicate to a user that upon depressing the button, the contents of the window 202a will be expanded. Document window 202a may be referred to as being collapsed, shrunken, minimal or non-expanded, since either the contents within window 202a, or the size (dimensions) of window 202a itself, may be expanded or increased upon activating button 204.

Figure 2B:
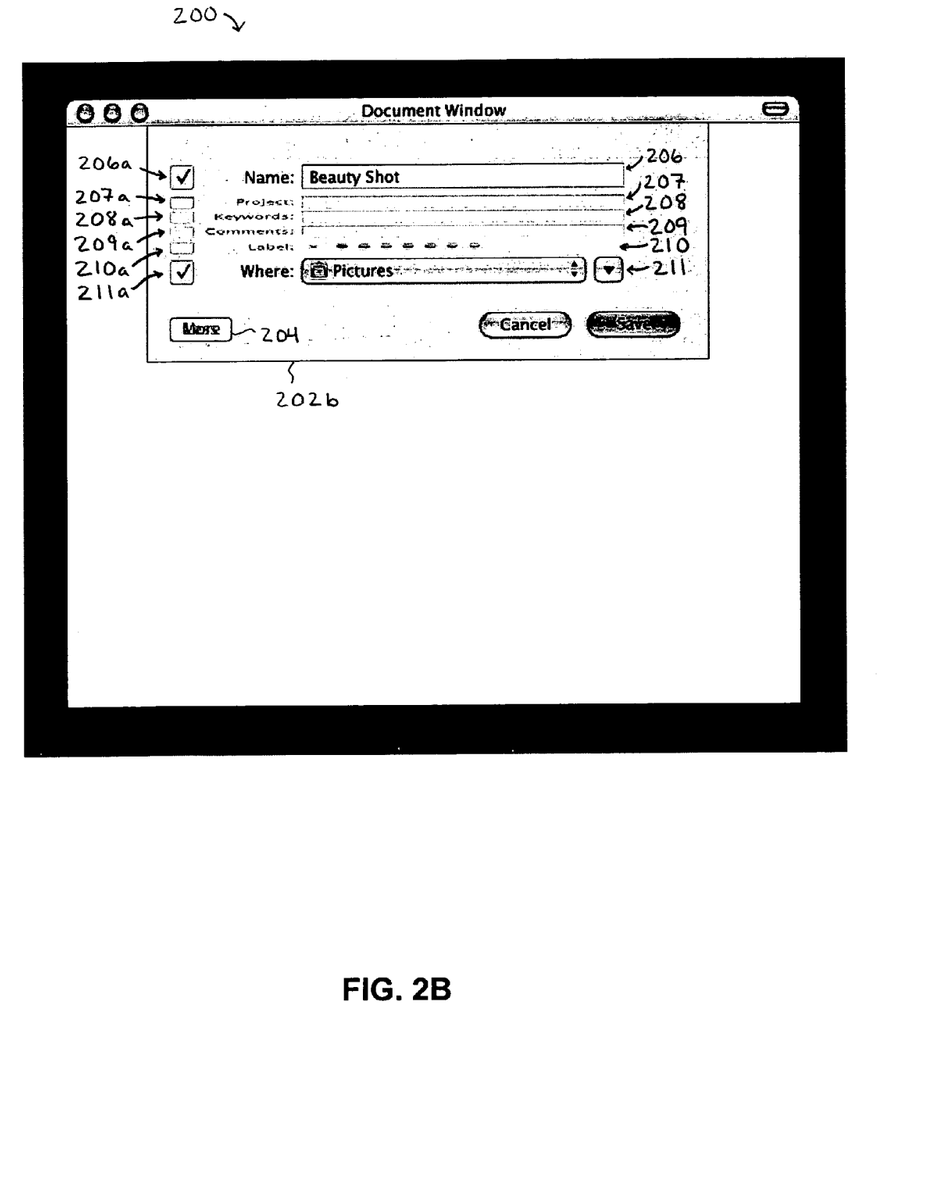

FIG. 2B illustrates an embodiment of a transition phase between the embodiments illustrated in FIG. 2A and FIG. 2C, discussed below. The transition phase illustrated in FIG. 2B results when button 204 is depressed (activated) from the state illustrated in FIG. 2A. In one embodiment, button 204 is activated in response to a received user command, such as input from a pointing device or a keyboard. Upon depressing or otherwise activating button 204 of FIG. 2A, dialog window 202a expands to reveal additional GUI elements 207, 208, 209, and 210 which are available for inclusion in the collapsed dialog window 202a. In one embodiment, dialog window 202b expands or "grows" in an animated fashion, making it appear as though the window itself is being stretched to accommodate the additional GUI elements. In one embodiment, the expansion of window 202a is similar to the stretching of the pleats of an accordion, in that the additional GUI elements are presented in a manner that appears as if they are being unfolded from in between GUI elements 206 and 211. In another embodiment, the contents of dialog window 202a change, while the dimensions of the window 202a remain the same.

Figure 2C:
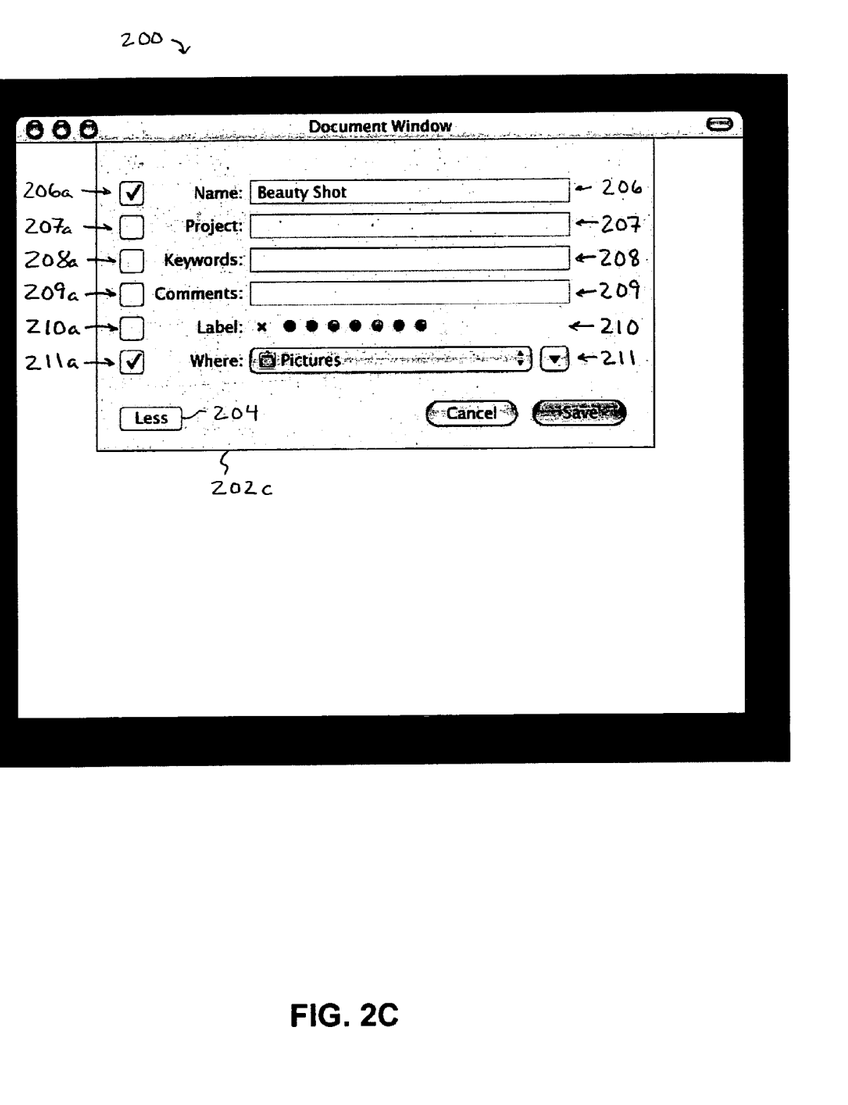

FIG. 2C illustrates an embodiment of document window 202c in an expanded state. By expanded state, it is meant that the contents of the window 202c are expanded as compared to that of the collapsed window 202a. In one embodiment, the dimensions of the collapsed window 202a and the expanded window 202c are the same. In one embodiment, there are more GUI elements displayed within the expanded state of the window 202c than in the collapsed state of the window 202a. Although not required, in one embodiment, when the window is in the expanded state, the dimensions of the window 202c itself may be expanded as compared to that of the collapsed window 202a, as illustrated in FIG. 2C. In one embodiment, when the window 202a is in a collapsed state, the GUI elements are not selectable for removal from the window 202a.

In an alternative embodiment, when the window 202a is in a collapsed state, each GUI element is selectable for removal. For example, in one embodiment, a close button (e.g. similar to a close button used to close a window) may be associated with each GUI element in the collapsed state of the window 202a. When the close button is clicked, the respective GUI element associated with the close button is removed from the collapsed window. In one embodiment, when a GUI element is removed in this manner, the GUI element may be made to appear to shrink and fly into the "More" button 204, so it appears as though the GUI element has been pulled into the "More" button 204 until it disappears from the GUI object. This is advantageous, as it informs the user "where" the removed GUI element has moved to, since the user may restore the GUI element within the GUI object by clicking the "more" button 204, and selecting the GUI element for display.

Several features of the expanded window 202c are different from the collapsed window 202a. In one embodiment, the label of button 204 is changed to indicate to a user that upon depressing the button 204, the contents of the window 202c will be collapsed. For example, as illustrated in FIG. 2C, button 204 is now labeled "Less" to indicate that activating the button 204 will result in collapsing the contents of window 202c. It will be appreciated that other text or symbols may be used to indicate that activation of button 204 in the expanded state will result in the collapsing of the window 202c. For example, the orientation of a directional arrow or symbol may indicate that activation of the button 204 will cause the window 202 to collapse or expand, respectively.

In addition to the additional GUI elements 207, 208, 209, and 210 displayed in the expanded window 202c, in one embodiment, a series of control elements 206a, 207a, 208a, 209a, 210a and 211a appear adjacent to their respective GUI element. In the embodiment illustrated, controls 206a, 207a, 208a, 209a, 210a and 211a are checkboxes. For example, checkbox 206a corresponds to GUI element 206, checkbox 207a corresponds to GUI element 207, and so on. The status of a checkbox, e.g. checked or unchecked, corresponds to whether the associated GUI element will appear in the collapsed state of the window 202. In this respect, the GUI elements 206-211 are selectable for inclusion or display in the collapsed state of the window 202. In the embodiment illustrated in FIG. 2C, checkboxes 206a and 211a are initially checked, since GUI elements 206 and 211 appeared in the collapsed state of the window 202a.

It will be appreciated that other control elements besides checkboxes may be used with embodiments of the present invention to select a GUI element for display or inclusion in the collapsed window 202. For example, push buttons, scroll bars, radio buttons, sliders, highlighting, and pop-up menus may also be used, among other well known control elements. In one embodiment, an unselected GUI element remains dimmed, whereas a selected GUI element is presented at a standard brightness level. In one embodiment, a selected GUI element is highlighted to indicate its selected status. In one embodiment, each GUI element still remains functional although the GUI object (e.g. window 202) is in an expanded state. For example, in the case of a GUI element such as a text input field 206, a user may still enter text into the field 206 even though the window 202 is in an expanded state.

In one embodiment, a user may reorder GUI elements within the expanded window 202c. For example, in one embodiment, a user may drag (e.g. with a mouse) an individual GUI element to drop/place it in the desired order among the other GUI elements. In one embodiment, as described below, the final order of the GUI elements in the expanded state of the window 202c before it is collapsed is maintained in the collapsed state of the window.

In an alternate embodiment, the expanded state of the window 202c may be split into two portions. For example, in one embodiment, a top portion is for active GUI elements (i.e. GUI elements which will be displayed in the collapsed state of the window), while a bottom portion is for inactive GUI elements (i.e. GUI elements which will not be displayed in the collapsed state of the window). Since all available GUI elements would be displayed within the GUI object, a user could easily drag and drop GUI elements from the inactive region to the active region to include them in the collapsed window. Similarly, a user could drag and drop a GUI element from the active region to the inactive region to exlcude the GUI element from the collapsed state of the window.

Figure 2D:
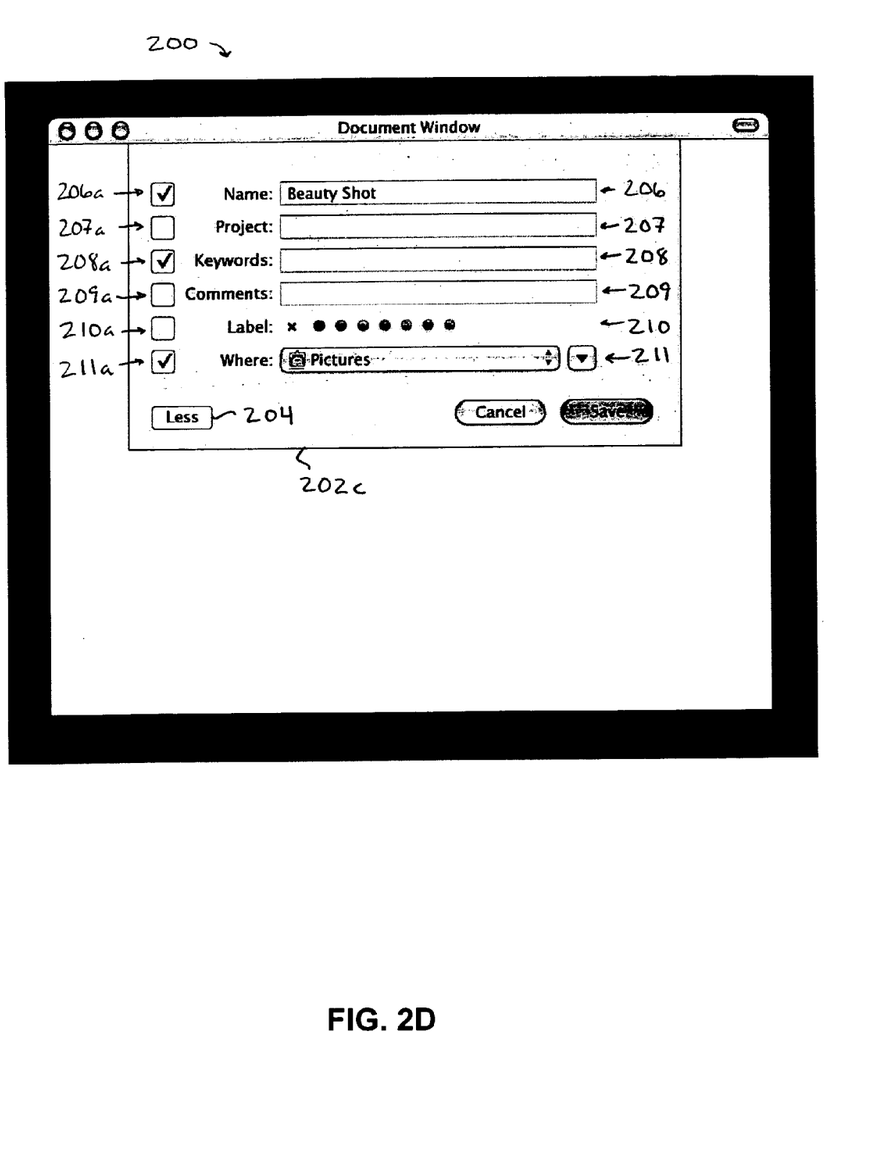

Referring to the embodiment illustrated in FIG. 2D, a user may select additional GUI elements for inclusion in the collapsed state of the window 202. For example, in one embodiment, a user may use a mouse or keyboard command to check the checkbox 208a to include GUI element 208 (the "Keywords" field) in the collapsed state of the window 202. Similarly, a user may also deselect (e.g. uncheck) a selected GUI element, so that it is not included in the collapsed state of the window 202. In one embodiment, by deselect, it is meant that through an action of the user, a visual cue is removed from a previously selected element, such as for example unchecking a checkbox, removing highlighting from an item in a list, deactivating a button, etc. In one embodiment, if a control element associated with a GUI element is unselected, the associated GUI element will not appear in the collapsed state of the GUI object. It will be appreciated that a user may select or deselect multiple GUI elements in the expanded state of the window 202c. For clarity, an example of an embodiment in which a user has selected an additional GUI element 208 for inclusion is illustrated.

Figure 2E:
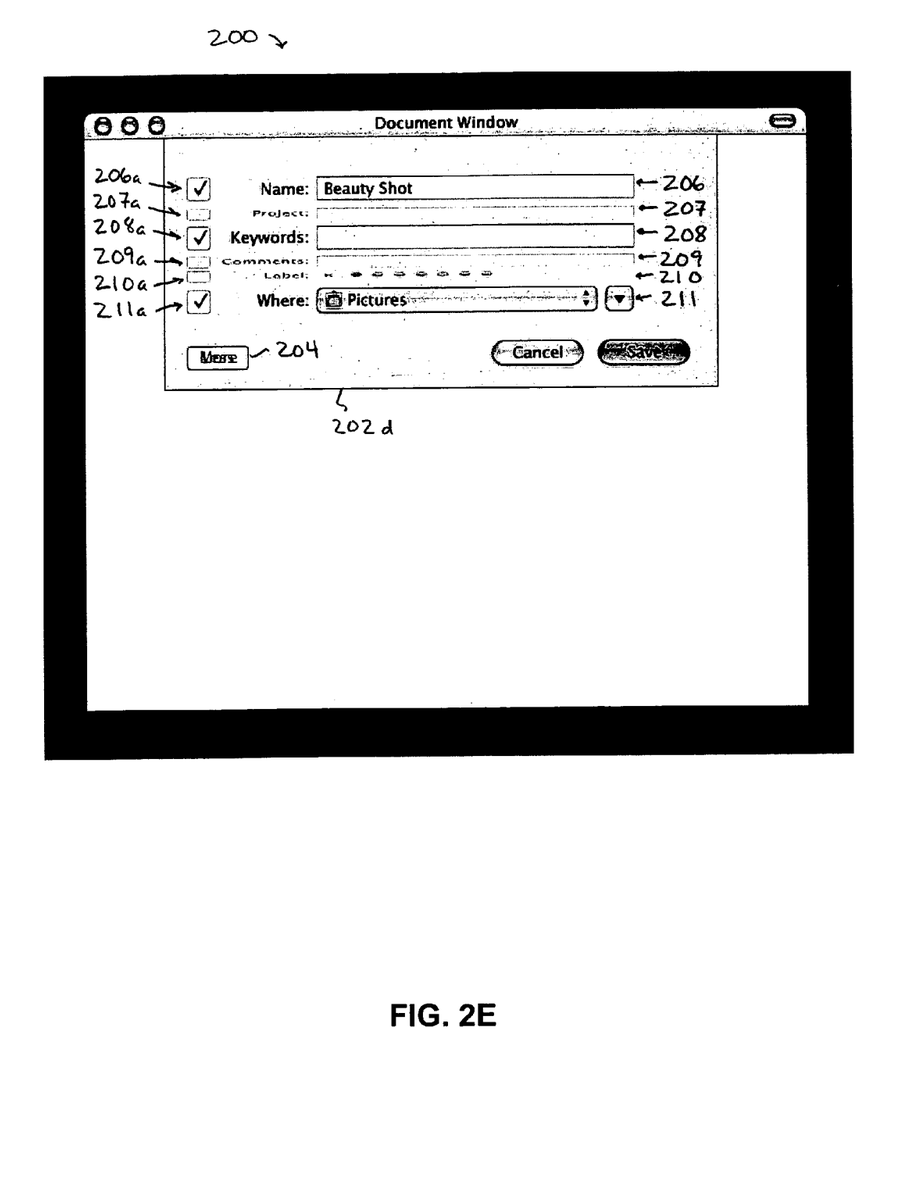

Once a user has completed their selection or deselection of GUI elements, the user may click on button 204 to collapse the window 202c. FIG. 2E illustrates an embodiment of a transition phase between the embodiments illustrated in FIG. 2D and FIG. 2F, discussed below. The transition phase illustrated in FIG. 2E results when button 204 is depressed (activated) from the expanded state illustrated in FIG. 2D. The transition phase illustrated in FIG. 2E is similar to that illustrated in FIG. 2B, except in reverse. Upon depressing or otherwise activating button 204 of FIG. 2D, dialog window 202c collapses. Any unselected GUI elements, such as 207, 209, and 210 are removed from the window 202d. In one embodiment, dialog window 202d collapses in an animated fashion, making it appear as though the window itself is being compressed to hide the unselected GUI elements from display. In one embodiment, the collapse of window 202c is similar to the compression of the pleats of an accordion, in that the unselected GUI elements appear as if they are being folded into the window between selected GUI elements 206, 208 and 211.

In one embodiment, the order of the GUI elements available for inclusion in the window 202 is maintained, or fixed, in both the expanded and compressed states of the window 202. Additionally, in one embodiment, the expansion or compression of the window content reflects the order of the GUI elements in the expanded state of the window 202c. For example, in FIGS. 2B and 2C, GUI elements 207-210 appear from in between GUI elements 206 and 211. Likewise, FIGS. 2D and 2E illustrate that after GUI element 208 was selected for inclusion in window 202, the unselected GUI elements 209 and 210 are removed from their respective position in between the selected GUI elements 208 and 211. In one embodiment, this feature makes it appear to a user that the unselected GUI elements disappear from between selected GUI elements.

Figure 2F:
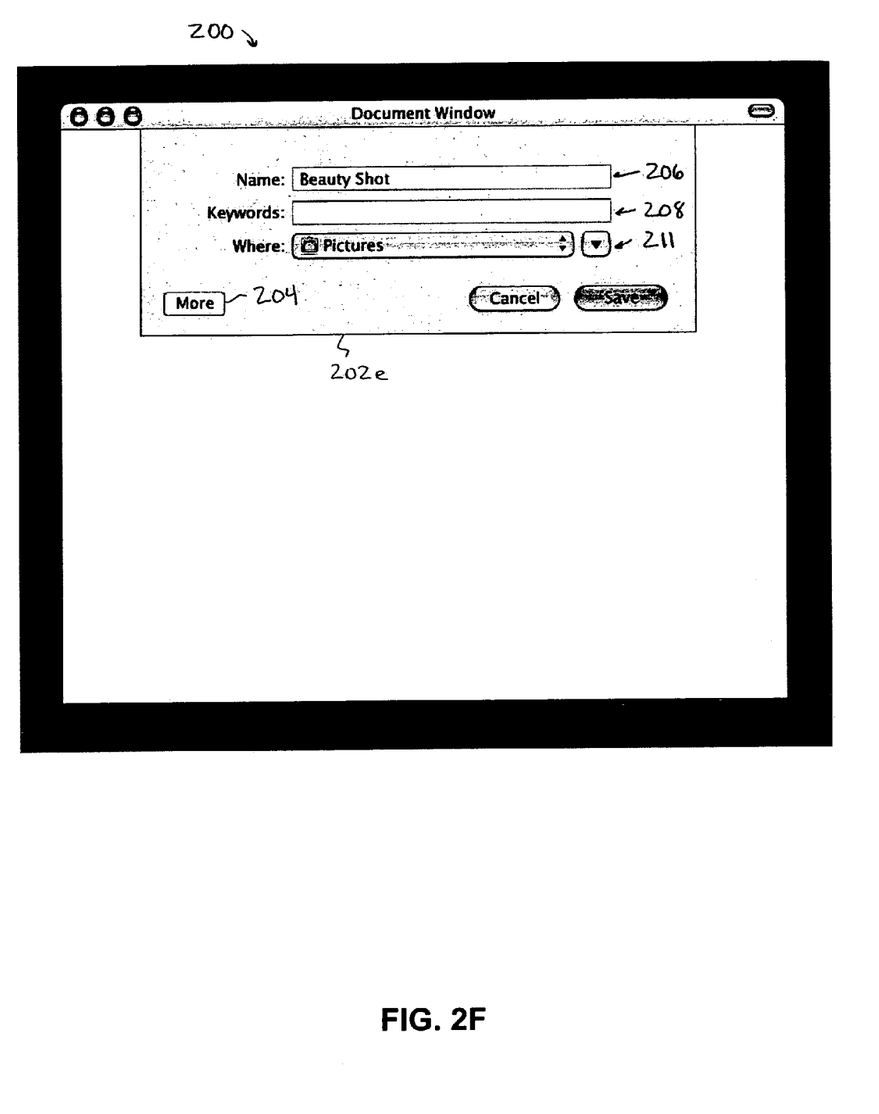

FIG. 2F illustrates an embodiment of a collapsed window 202e which includes GUI elements 206, 208 and 211. It is noted that checkboxes for the GUI elements have been removed, indicating that the GUI elements 206, 208 and 211 are not currently selectable for inclusion in the window. In other words, within the collapsed state of the window 202, the GUI elements 206, 208 and 211 are fixed within the window 202, although they may remain manipulable by a user. In addition, GUI elements 207, 209 and 210 have been removed from the window 202. Button 204 has reverted to its function of expanding the window 202, as indicated by its "More" label. In one embodiment, the size of window 202e, illustrated in FIG. 2F, is larger than that of window 202a, illustrated in FIG. 2A, since window 202e includes three GUI elements 206, 208 and 211, whereas window 202a includes only two GUI elements 206 and 211.

In one embodiment, the Save dialog window 202 may exclude a GUI element (e.g. element 211) associated with a location in which to save the file. The dialog window 202 may still include other elements such as fields for naming the file or other input. One advantage of this embodiment is that a user may be able to automatically save a file to a predetermined location, thereby reducing clutter and simplifying the save dialog.

Figure 3A:
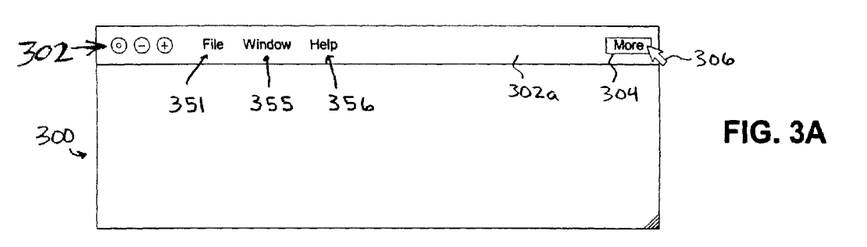
FIGS. 3A-3D illustrate embodiments of a graphical user interface menu bar having an inline customization functionality.

FIGS. 3A-3D illustrate embodiments of a GUI object having inline customization functionality. In the embodiment illustrated in FIG. 3A, the GUI object is a menu bar (or title bar) 302. In one embodiment, a menu bar is a rectangular GUI object in which user manipulable elements are often located. In one embodiment, a menu bar is a rectangular portion at the top of a window 300, as illustrated in FIG. 3A. In another embodiment, a menu bar is a rectangular portion positioned along the edge of a display area (or screen) of a display device, such as along the top of a display area, as in the Mac OS X, operating system available from Apple Computer, Inc., the assignee of the present invention. In the embodiment illustrated, user manipulable elements 351, 355, and 356 are menu items within menu bar 302. In one embodiment, menu items 351, 355, and 356 are pull-down menus that may be manipulated by a user through a pointing device, such as a mouse. A pull-down menu may also be referred to as a "drop-down menu" or "pop-down menu." Pull-down menus include a menu title is displayed, that, when selected by clicking it, causes the menu to drop down from that position and be displayed. When manipulated or activated by a user (e.g. clicked upon through a pointing device cursor 306), the menu items drop down and present lists of items (e.g. commands, attributes, or states) from which the user can choose. In one embodiment, menu bar 302 includes a button 304 which controls the expansion of the contents of menu bar 302a. In one embodiment, the button 304 may be labeled "More," to indicate to a user that upon depressing the button 304, the contents of the menu bar 302a will be expanded.

Figure 3B:
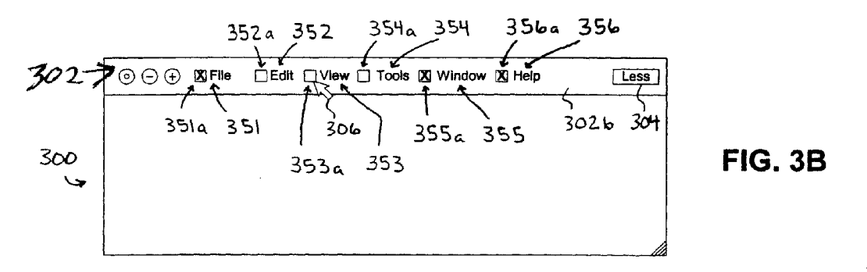

FIG. 3B illustrates an embodiment of menu bar 302b in an expanded state. By expanded state, it is meant that additional GUI elements 352, 353, and 354 are presented in the menu bar 302b. In one embodiment, although not required, the dimensions of the menu bar 302 may expand to accommodate the presentation of additional available GUI elements for display within menu bar 302. Several features of the expanded menu bar 302b are different from the collapsed menu bar 302a. In one embodiment, the label of button 304 is changed to indicate to a user that upon depressing the button 304, the contents of the window 302b will be collapsed. For example, as illustrated in FIG. 3B, button 304 is now labeled "Less" to indicate that activating the button 304 will result in collapsing the contents of menu bar 302b so that only selected GUI elements are included within the menu bar 302. It will be appreciated that other text or symbols may be used to indicate that activation of button 304 in the expanded state will result in the collapsing of the menu bar 302b.

In addition to the additional GUI elements 352, 353, and 354 displayed in the expanded menu bar 302b, in one embodiment, a series of checkboxes 351a, 352a, 353a, 354a, 355a and 356a appear adjacent to their respective GUI element. For example, checkbox 351a corresponds to GUI element 351, and so on. The status of a checkbox, e.g. checked or unchecked, corresponds to whether its associated GUI element will appear in the collapsed state of the menu bar 302. In this respect, the GUI elements 351-356 are each individually selectable for inclusion or display in the collapsed state of the menu bar 302a. In the embodiment illustrated in FIG. 3B, checkboxes 351a, 355a and 356a are initially checked, since GUI elements 351, 355 and 356 appeared in the collapsed state of the menu bar 302a in FIG. 3A. It will be appreciated that in other embodiments, other control elements besides checkboxes may be used.

Figure 3C:
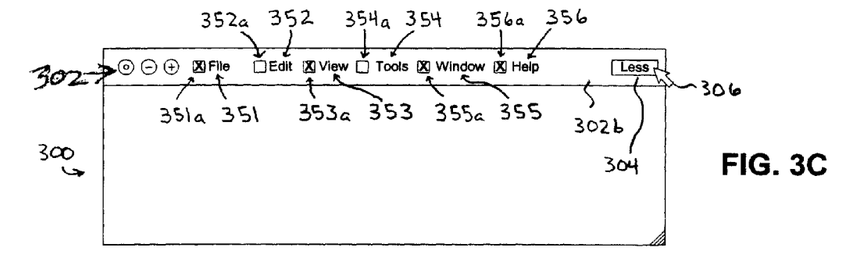
Figure 3D:
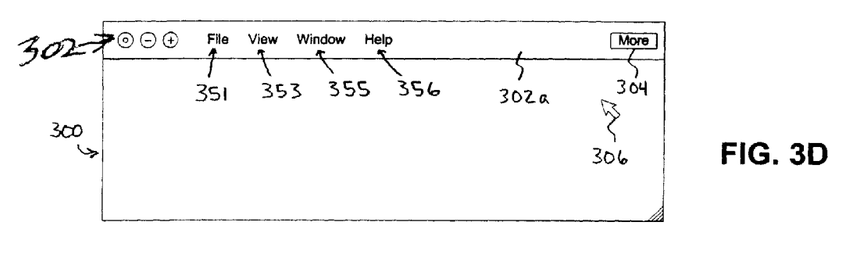

As illustrated in the embodiment of FIG. 3C, a user may use a pointing device, such as a mouse cursor, to select additional GUI elements for inclusion within the collapsed menu bar. For example, GUI element 353 is selected for inclusion in the menu bar by checking its associated checkbox 353a. A user may also deselect GUI elements to remove them from the collapsed state of the menu bar 302a. After completing their selection and/or deselection, if any, of the available GUI elements, the user may use a pointing device to click button 304, thereby causing the menu bar 302b to return to a collapsed state, as illustrated in FIG. 3D. In one embodiment, the transition phases between the menu bar's 302 collapsed and expanded states may be made to appear animated, similar to the embodiments described above with respect to FIGS. 2A-2F. In one embodiment, when transitioning between a collapsed state and an expanded state, additional unselected GUI elements may appear in between existing selected GUI elements. In another embodiment, when transitioning between a collapsed state and an expanded state, additional GUI elements may pop-up into their respective positions. Similarly, in one embodiment, when transitioning between an expanded state and a collapsed state, unselected GUI elements may disappear from their respective positions. In one embodiment, upon collapse of an expanded menu bar (or other GUI object), the remaining selected GUI elements shift their position to fill in gaps left by unselected GUI elements.

In one embodiment, the order or sequence of the GUI elements, whether unselected or selected, is maintained in both the expanded and collapsed state. For example, the order of GUI elements within the collapsed state of the menu bar 302a will coincide with the order in which the available GUI elements are presented in the expanded state of the menu bar 302b.

It will be appreciated that embodiments of the present invention may be incorporated into a variety of GUI objects. For example, in one embodiment, a pull-down menu may have inline customization functionality. Such a menu may include a button to expand the pull-down menu, thereby displaying all available options for inclusion in the pull-down menu. Each available option may be selectable, such as through being associated with a checkbox or other control feature. In one embodiment, the menu may expand vertically. In another embodiment, the menu may expand horizontally. Similarly, the menu may include a button to collapse the pull-down menu after a user has selected the desired options.

In another embodiment, the inline customization functionality may be included into an electronic mail (email) program. For example, in one embodiment, when creating a message, a user may expand a portion of the composition window to quickly reveal selectable options relating to the compose window, such as "To:", "From:", "Cc:", "Priority", "Account" and other fields or menus.

In another embodiment, within a GUI object having inline customization functionality, an individual GUI element may itself have inline customization functionality. For example, a user could configure the characteristics of an individual GUI element within a GUI object. The advantages of configuring a GUI element inline within the GUI object in which it is displayed, may thus be implemented hierarchically. It will be appreciated that the applications of embodiments of the present invention are varied.

Figure 4:
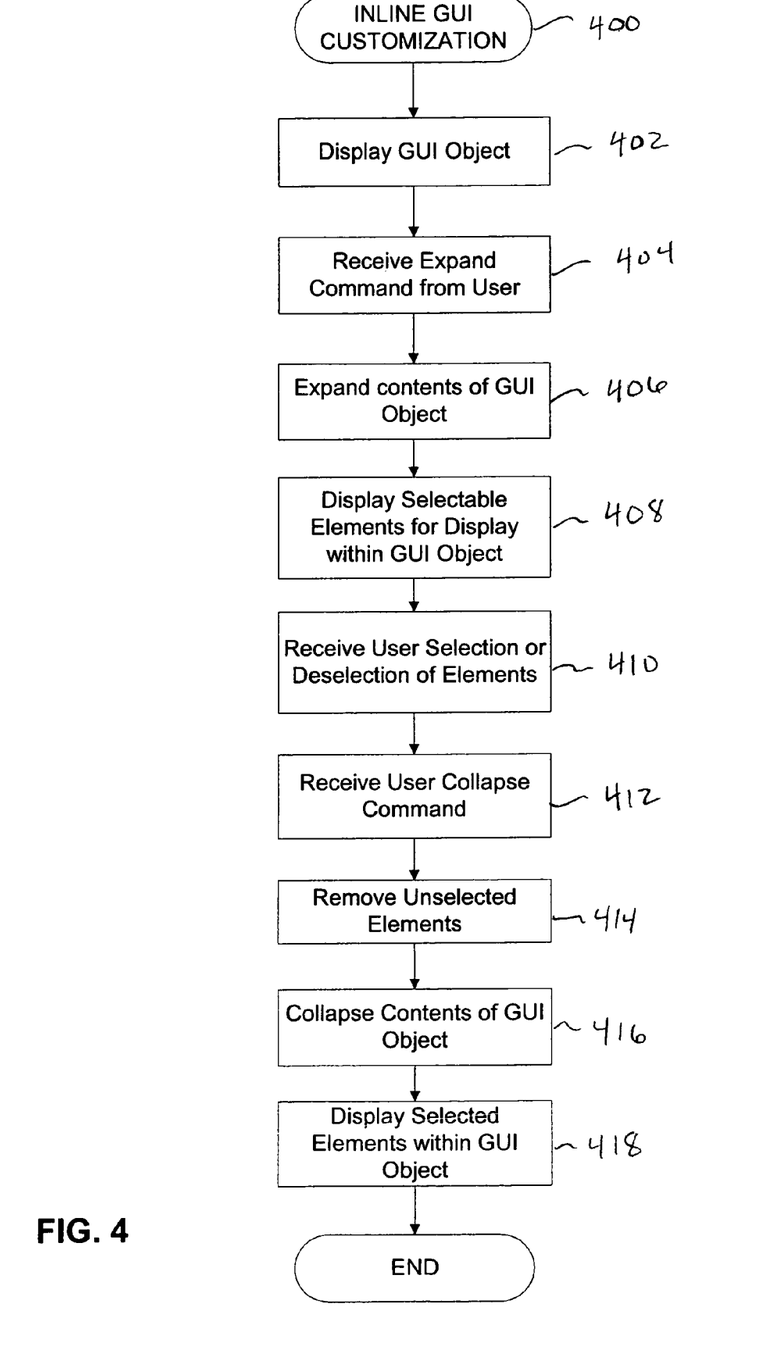
FIG. 4 illustrates an embodiment of an inline graphical user interface customization method.

FIG. 4 illustrates an embodiment of a method 400 for inline GUI customization. Embodiments of the method 400 may be used to customize GUI objects. In one embodiment, a GUI object, such as a window, is displayed by the method 400 (Block 402). In one embodiment, the window displays one or more user manipulable GUI elements, such as for example an input field. An expand command is received by the method 400 from the user (Block 404). The expand command may be triggered by a user through a mouse, a keyboard, or other input device. In one embodiment, a user clicks on a button within the GUI object to invoke the expand command. In response to receiving the expand command, the method 400 expands the contents of the GUI object (Block 406). In one embodiment, expanding the contents of the GUI results in the display of additional GUI elements, if any additional unselected GUI elements are available for inclusion in the GUI object. In another embodiment, expanding the contents of the GUI object also results in the expansion of the dimensions of the GUI object. For example, in one embodiment, the window may be expanded.

The method 400 displays selectable GUI elements for display within the expanded GUI object (Block 408). The GUI elements are selectable, meaning that they may be selected or deselected. The status of each GUI element (i.e. selected or unselected), indicates whether the GUI element will appear in the collapsed state of the GUI object. The method 400 receives user selection or deselection of the GUI elements, if any (Block 410). It is noted that in one embodiment, after expanding the GUI object, a user is not required to make alterations to the status of any GUI element; the user may leave the GUI element selection as it is. The method 400 receives a collapse command from the user (Block 412). In one embodiment, the collapse command may be triggered in a similar manner as the expand command. In response to the collapse command, the method 400 removes any unselected GUI elements (Block 414). The method 400 then collapses the contents of the GUI object (Block 416). In one embodiment, collapsing the contents of the GUI results in the display of fewer GUI elements if any GUI elements remain unselected. In another embodiment, collapsing the contents of the GUI object also results in the reduction of the dimensions of the GUI object. For example, in one embodiment, the area of the window may be reduced.

The method 400 displays the selected GUI elements within GUI object within the collapsed GUI object (Block 418). In one embodiment, the selected GUI elements which are included in the collapsed GUI object are no longer "selectable" for inclusion, since they have already been included. For example, if the GUI elements were made selectable through an associated control elements, such as a checkbox, then the checkbox does not appear in the collapsed state of the GUI object. For example, in one embodiment, a GUI element is made selectable for inclusion by associating it with a control element such as a check box. If the GUI element is selected for inclusion, e.g. by checking the box, then the GUI element appears in the collapsed GUI object, without an associated checkbox.

It will be appreciated that in one embodiment, a user is able to expand or collapse the GUI object repeatedly at will, selecting or deselecting a variety of combinations of available optional GUI elements. In one embodiment, a user may deselect all available optional GUI elements. An advantage of this may be to minimize clutter in a window or reduce the amount of space a GUI object takes on the screen by eliminating GUI elements which are not needed by a user. In addition, a user may easily discover available features or options which are available for inclusion in a GUI object.

The methods described above constitute computer programs made up of computer-executable instructions illustrated as blocks (acts) within the flow chart of FIG. 4. Describing the methods by reference to a flow chart enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the method illustrated in FIG. 4 without departing from the scope of the invention and that no particular order is implied by the arrangement of blocks shown and described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    displaying, using one or more processing units, a collapsed window including one or more selected graphical elements and an expand control, wherein unselected graphical elements are incapable of being displayed in the collapsed window;
    receiving, using the one or more processing units, an activation of the expand control;
    changing, using the one or more processing units, the expand control into a collapse control in response to the activation of the expand control;
    expanding, using the one or more processing units, the collapsed window into an expanded window, wherein the expanded window includes the selected graphical elements and unselected graphical elements;
    displaying, using the one or more processing units, an interactive control associated with each selected graphical element and each unselected graphical element;
    receiving, using the one or more processing units, a selection of an interactive control associated with an unselected graphical element;
    receiving, using the one or more processing units, an activation of the collapse control;
    changing, using the one or more processing units, the collapse control into an expand control in response to the activation of the collapse control;
    changing, using the one or more processing units, the expanded window into a modified collapsed window, wherein the modified collapsed window includes each graphical element associated with a selected interactive control, and wherein graphical elements that are not associated with a selected interactive control are incapable of being displayed in the modified collapsed window; and displaying, using the one or more processing units, the modified collapsed window.

2. The method of claim 1, wherein collapsing or expanding the window is performed in an animated fashion.

3. The method of claim 1, wherein dimensions of the modified collapsed window are determined by the selected graphical elements.

4. The method of claim 1, further comprising:
displaying, using the one or more processing units, one or more removal controls in the collapsed window, wherein each removal control is associated with a selected graphical element; and receiving, using the one or more processing units, an activation of a removal control, wherein the activation causes the associated selected graphical element to be removed from the collapsed window using a removal animation.

5. The method of claim 4, wherein the removal animation includes moving the graphical element into the expand control.

6. The method of claim 5, wherein selecting the expand control facilitates restoring the removed graphical element.

7. The method of claim 1, wherein the graphical elements are ordered, and wherein the order is maintained when the window is expanded and collapsed.

8. The method of claim 1, further comprising:
receiving, using the one or more processing units, a selection of an interactive control associated with a selected graphical element when the window is expanded, wherein the selection causes the selected graphical element to become an unselected graphical element.

9. The method of claim 1, wherein the graphical elements are ordered, wherein the order is modifiable when the window is expanded, and wherein modifications to the order are maintained when the window is collapsed.

10. The method of claim 1, wherein graphical elements associated with selected interactive controls shift positions in the modified collapsed window.

11. The method of claim 1, wherein one or more graphical elements are customizable using inline customization.

12. The method of claim 1, wherein graphical elements in an expanded window are categorized, and wherein the categorization is modifiable.

13. A system, comprising:
one or more processors;
a non-transitory computer-readable storage medium containing instructions configured to cause the one or more processors to perform operations, including:
displaying a collapsed window including one or more selected graphical elements and an expand control, wherein unselected graphical elements are incapable of being displayed in the collapsed window;
receiving an activation of the expand control;
changing the expand control into a collapse control in response to the activation of the expand control;
expanding the collapsed window into an expanded window, wherein the expanded window includes the selected graphical elements and unselected graphical elements;

displaying an interactive control associated with each selected graphical element and each unselected graphical element;

receiving a selection of an interactive control associated with an unselected graphical element;

receiving an activation of the collapse control;

changing the collapse control into an expand control in response to the activation of the collapse control;

changing the expanded window into a modified collapsed window, wherein the modified collapsed window includes each graphical element associated with a selected interactive control, and wherein graphical elements that are not associated with a selected interactive control are incapable of being displayed in the modified collapsed window; and displaying the modified collapsed window.

14. The system of claim 13, wherein collapsing or expanding the window is performed in an animated fashion.

15. The system of claim 13, wherein dimensions of the modified collapsed window are determined by the selected graphical elements.

16. The system of claim 13, further comprising instructions configured to cause the one or more processors to perform operations, including:
displaying one or more removal controls in the collapsed window, wherein each removal control is associated with a selected graphical element; and receiving an activation of a removal control, wherein the activation causes the associated selected graphical element to be removed from the collapsed window using a removal animation.

17. The system of claim 16, wherein the removal animation includes moving the graphical element into the expand control.

18. The system of claim 17, wherein selecting the expand control facilitates restoring the removed graphical element.

19. The system of claim 13, wherein the graphical elements are ordered, and wherein the order is maintained when the window is expanded and collapsed.

20. The system of claim 13, further comprising instructions configured to cause the one or more processors to perform operations, including:
receiving a selection of an interactive control associated with a selected graphical element when the window is expanded, wherein the selection causes the selected graphical element to become an unselected graphical element.

21. The system of claim 13, wherein the graphical elements are ordered, wherein the order is modifiable when the window is expanded, and wherein modifications to the order are maintained when the window is collapsed.

22. The system of claim 13, wherein graphical elements associated with selected interactive controls shift positions in the modified collapsed window.

23. The system of claim 13, wherein one or more graphical elements are customizable using inline customization.

24. The system of claim 13, wherein graphical elements in an expanded window are categorized, and wherein the categorization is modifiable.

25. A computer-program product, tangibly embodied in a non-transitory machine-readable storage medium, including instructions configured to cause a data processing apparatus to:
display a collapsed window including one or more selected graphical elements and an expand control, wherein unselected graphical elements are incapable of being displayed in the collapsed window;

receive an activation of the expand control;
change the expand control into a collapse control in response to the activation of the expand control;
expand the collapsed window into an expanded window, wherein the expanded window includes the selected graphical elements and unselected graphical elements;
display an interactive control associated with each selected graphical element and each unselected graphical element;
receive a selection of an interactive control associated with an unselected graphical element;
receive an activation of the collapse control;
change the collapse control into an expand control in response to the activation of the collapse control;
change the expanded window into a modified collapsed window, wherein the modified collapsed window includes each graphical element associated with a selected interactive control, and wherein graphical elements that are not associated with a selected interactive control are incapable of being displayed in the modified collapsed window; and
display the modified collapsed window.

26. The computer-program product of claim 25, wherein collapsing or expanding the window is performed in an animated fashion.

27. The computer-program product of claim 25, wherein dimensions of the modified collapsed window are determined by the selected graphical elements.

28. The computer-program product of claim 25, further comprising instructions configured to cause a data processing apparatus to:
display one or more removal controls in the collapsed window, wherein each removal control is associated with a selected graphical element; and
receive an activation of a removal control, wherein the activation causes the associated selected graphical element to be removed from the collapsed window using a removal animation.

29. The computer-program product of claim 28, wherein the removal animation includes moving the graphical element into the expand control.

30. The computer-program product of claim 29, wherein selecting the expand control facilitates restoring the removed graphical element.

31. The computer-program product of claim 25, wherein the graphical elements are ordered, and wherein the order is maintained when the window is expanded and collapsed.

32. The computer-program product of claim 25, further comprising instructions configured to cause a data processing apparatus to:
receive a selection of an interactive control associated with a selected graphical element when the window is expanded, wherein the selection causes the selected graphical element to become an unselected graphical element.

33. The computer-program product of claim 25, wherein the graphical elements are ordered, wherein the order is modifiable when the window is expanded, and wherein modifications to the order are maintained when the window is collapsed.

34. The computer-program product of claim 25, wherein graphical elements associated with selected interactive controls shift positions in the modified collapsed window.

35. The computer-program product of claim 25, wherein one or more graphical elements are customizable using inline customization.

36. The computer-program product of claim 25, wherein graphical elements in an expanded window are categorized, and wherein the categorization is modifiable.

37. The method of claim 1, wherein selected graphical elements are associated with a selected interactive control, and wherein unselected graphical elements are not associated with a selected interactive control.

38. The system of claim 13, wherein selected graphical elements are associated with a selected interactive control, and wherein unselected graphical elements are not associated with a selected interactive control.

39. The computer-program product of claim 25, wherein selected graphical elements are associated with a selected interactive control, and wherein unselected graphical elements are not associated with a selected interactive control.

* * * * *